United States Patent [19]

Prince, Jr.

[11] Patent Number: 4,765,164

[45] Date of Patent: Aug. 23, 1988

[54] SPARE TIRE BRACKET LOCK

[76] Inventor: John W. Prince, Jr., 17911 Ridge Top, Houston, Tex. 77090

[21] Appl. No.: 15,300

[22] Filed: Feb. 17, 1987

[51] Int. Cl.[4] .................. B65D 43/04; F16B 41/00
[52] U.S. Cl. ........................ 70/259; 70/230; 70/232; 224/42.25; 248/552; 414/463
[58] Field of Search .............. 411/910; 70/259, 260, 70/230, 232, 14, 158, 163, 164, 225, 234; 224/42.23, 42.25, 42.2, 42.06; 414/463; 248/552, 553, 551

[56] References Cited

U.S. PATENT DOCUMENTS

| | | | |
|---|---|---|---|
| 1,438,574 | 12/1922 | Briggs | 224/42.25 X |
| 1,587,976 | 6/1926 | Moore | 70/260 |
| 1,650,578 | 11/1927 | Wyman | 70/230 |
| 1,831,513 | 11/1931 | Sitz et al. | 70/260 |
| 2,090,167 | 8/1937 | Wiley | 411/520 X |
| 2,315,245 | 3/1943 | Collier | 70/259 |
| 2,956,716 | 10/1960 | Goulet | 224/42.23 X |
| 3,498,400 | 3/1970 | Hysmith | 70/230 |
| 3,918,599 | 11/1975 | Porter | 224/42.25 X |
| 3,943,738 | 3/1976 | Foote | 70/230 |
| 3,990,618 | 11/1976 | Shattuck | 224/42.25 X |
| 4,042,158 | 8/1977 | Cole | 224/42.23 |
| 4,117,963 | 10/1978 | Luczynski | 224/42.25 X |
| 4,278,191 | 7/1981 | Mecham | 224/42.23 X |
| 4,282,995 | 8/1981 | Austin | 224/42.23 |
| 4,407,146 | 10/1983 | Nielsen | 70/232 |
| 4,428,513 | 1/1984 | Delmastro | 224/42.23 X |

FOREIGN PATENT DOCUMENTS

| | | | |
|---|---|---|---|
| 968319 | 5/1975 | Canada | 70/259 |
| 0022102 | 1/1981 | European Pat. Off. | 70/232 |
| 703011 | 4/1966 | Italy | 70/232 |
| 1006236 | 9/1965 | United Kingdom | 224/42.23 |

Primary Examiner—Lloyd A. Gall
Attorney, Agent, or Firm—Kenneth A. Roddy

[57] ABSTRACT

A spare tire bracket lock for installation on the existing spare tire support bracket of a pick-up truck or similar vehicle of the type having an elongated spare tire support bracket for supporting the spare tire in the stored position against the undercarriage of the vehicle and an elongated threaded bolt extending vertically through an aperture at one end of the tire support bracket engaged by a flanged mounting nut having an eye therein. The spare tire bracket lock comprises an elongated tubular member which is slotted to be slidably received on one end of the support bracket. A pin inserted through aligned holes in the bracket lock side walls passes through the eye of the flange of the mounting nut and the shackle of a padlock received through a hole in the pin within the bracket lock secures the bracket lock on the support bracket to enclose the mounting nut and padlock and substantially surround the elongated threaded bolt restricting access to the padlock and the threaded bolt. A cap covers the open bottom of the spare tire bracket lock to shield the padlock and threaded bolt from water, mud, and debris to prevent chemical and physical damage thereto. A second tubular member is provided to surround another elongated bolt which hingedly retains the other end of the support bracket.

8 Claims, 2 Drawing Sheets

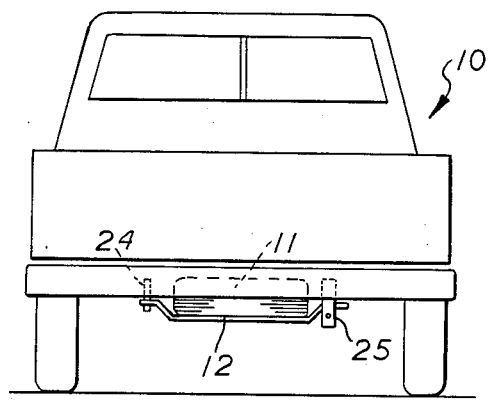
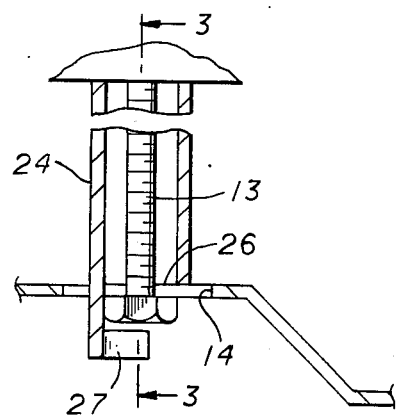
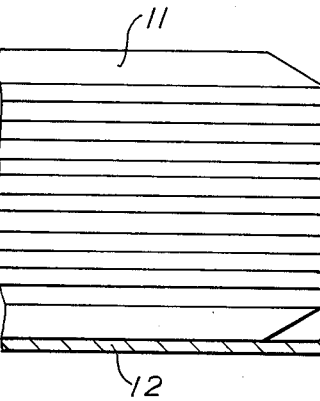
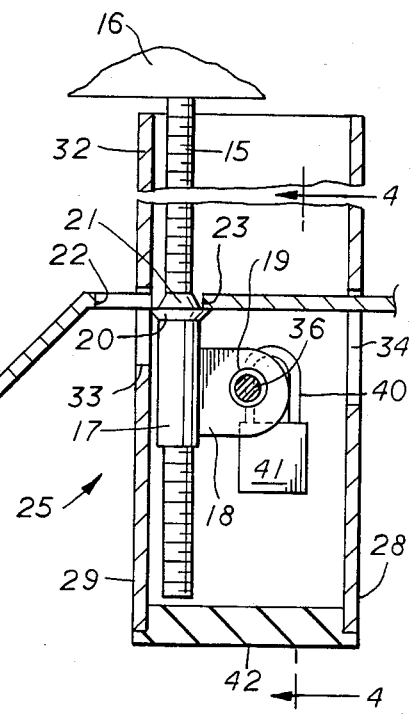
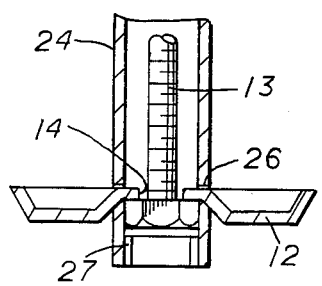
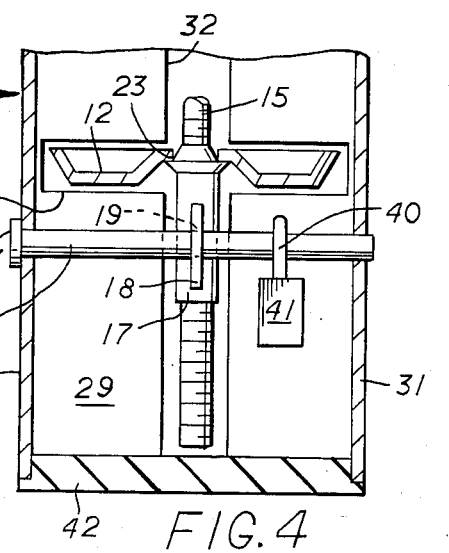

SPARE TIRE BRACKET LOCK

BACKGROUND OF THE INVENTION

1. Field of the Invention

This present invention relates generally to devices for locking spare tires to vehicles and, more particularly, to a spare tire bracket lock for use in conjunction with pick-up trucks and similar vehicles having a mounting bracket for storing a spare tire below the undercarriage of the vehicle.

2. Brief Description of the Prior Art

Pick-up trucks and similar vehicles are often equipped with a spare tire mounting bracket for storing a spare tire against the undercarriage of the vehicle, typically near the rear portion of the vehicle. The spare tire is supported by an elongated bracket or tire rack which clamps the tire against the underside of the vehicle. One end of the bracket is suspended by the enlarged head of a bolt which extends upwardly through a slotted hole in the support bracket and is secured at its upper end to the frame of the vehicle. The slotted hole at the first end of the support bracket allows the bracket to be rotated and tilted relative to the bolt to allow the spare tire to be accessed. A large and a small circular hole connected by a narrow passage are provided at a second end of the tire support bracket opposite the first end. An elongated, threaded second bolt is loosely secured at its upper end to the frame of the vehicle and extends downwardly in the vicinity of the large and small circular holes. The second bolt is loosely secured to permit lateral movement at the lower end of the bolt.

A mounting nut is provided for engaging the threads at the lower end of the second bolt and supporting the end of the bracket. Typically, the nut is constructed to include a flange extending laterally from the lower portion of the nut, the flange allowing the owner of the vehicle to more easily rotate the nut by hand. The upper portion of the nut includes a circular collar which fits within the small hole in the end of the bracket. The narrow passage in the end of the bracket is slightly wider than the diameter of the bolt but is smaller than the diameter of the circular collar. Therefore, when the spare tire is to be removed, the nut must be loosened sufficiently to permit the end of the bracket to be raised above the circular collar of the nut. The bolt can then be slid through the narrow passage and into the large circular hole through which the nut can be passed for allowing the end of the bracket to be lowered to the ground to provide access to the spare tire.

Thefts of spare tires from pick-up trucks and similar vehicles utilizing the above described spare tire storage assembly are very common since the nut incorporating the flange can be untightened, the bracket lowered, and the spare tire removed, all within a relatively short interval of time. To deter such thefts, manufactures of such vehicles typically provide an eye within the flange of the nut of sufficient size to permit the passage of a shackle of a padlock. The shackle of the padlock is also passed through the end links of a chain which is passed through the frame of the vehicle, the chain and the padlock thereby preventing rotation of the nut securing the bracket to the second bolt.

However, such measures have not proven very effective in deterring thefts of spare tires. Spare tire thieves often possess cutting tools such as bolt cutters which can be quickly applied on those portions of the chain which are accessible to the thief. Even when a heavy-duty hardened chain is used, thieves can apply the cutting tools directly to the shackle of the padlock rather than to the links of the chain in order to remove the spare tire. Often the thieves will simply cut the threaded bolt or bolts which hold the whole support bracket to eliminate the time to cut through the chain or padlock shackle. Additionally, such chains are noisy and are not conveniently installed or removed when the vehicle owner must access the spare tire. In the conventional spare tire support method, the chain, padlock, and threaded bolt extend a distance below the undercarriage and are often physically damaged or bent by striking the ground when the vehicle hits a bump. It is very common for water, mud, dirt and other debris to collect on the exposed depending parts and to become difficult if not impossible to remove as intended due to rust, corrosion, or other chemical damage.

Devices for locking spare tires to pick-up trucks and similar vehicles and brackets for preventing the theft of the spare tire are known in the art. There are several patents which disclose various spare tire locking devices.

Austin, U.S. Pat. No. 4,282,995 discloses a spare tire bracket lock which includes a lipped portion that slides over one edge of the tire support bracket, the flange of the mounting nut simultaneously sliding through a slot in the spare tire bracket lock. Locking members positioned adjacent opposite faces of the flange have holes aligned with the eye of the flange for allowing the shackle of a padlock to be passed through the holes in the locking members and the eye of the flange. The spare tire bracket lock also includes a shield plate for restricting access to the shackle of the padlock.

The U.S. Pat. Nos. of Cadmus, 3,175,742; Hunt et al, 1,761,920; Muschalek, 4,363,431; and Maurer, 3,884,057 are directed toward special spare tire carriers or means for supporting spare tires beneath the vehicle undercarriage. Barr, U.S. Pat. No. 4,225,066 is directed toward an apparatus for securing a spare tire in the bed portion of a pick-up truck.

German Pat. No. 1,238,793, Canadian Pat. No. 68,319, and British Pat. No. 784,718 disclose various other spare tire carriers or means for supporting spare tires beneath the vehicle undercarriage.

The present invention is distinguished over the prior art in general, and these patents in particular by a spare tire bracket lock comprising an elongated tubular member which is slotted to be slidably received on one end of the spare tire support bracket. A pin inserted through aligned holes in the bracket lock side walls passes through the eye of the flange of the support bracket mounting nut and the shackle of a padlock received through a hole in the pin within the bracket lock secures the bracket lock on the support bracket to enclose the mounting nut and padlock and substantially surround the elongated threaded bolt restricting access to the padlock and the threaded bolt. A cap covers the open bottom of the spare tire bracket lock to shield the padlock and threaded bolt from water, mud, and debris to prevent chemical and physical damage thereto. A second tubular member is provided to surround another elongated bolt which hingedly retains the other end of the support bracket.

SUMMARY OF THE INVENTION

It is therefore an object of the present invention to provide, for use in conjunction with vehicles of the type wherein a spare tire is stored upon a bracket secured to the undercarriage of the vehicle, a locking device which deters thefts of spare tires from such vehicles by substantially surrounding and enclosing the threaded bolt of the support bracket and the padlock within the locking device.

Another object of the present invention is to provide, for use in conjunction with a vehicle having a spare tire mounting bracket secured to a supporting bolt by a nut, a locking device which prevents a thief from rotating the nut and removing the spare tire.

Still another object of the present invention is to provide, for use in conjunction with vehicles having a spare tire mounting bracket secured to a supporting bolt by a nut having a flange with an eye therein for receiving the shackle of a padlock, a locking device which significantly restricts access by a thief to the padlock shackle.

A further object of the present invention is to provide, for use in conjunction with a vehicle having a spare tire mounting bracket secured to a supporting bolt by a nut, a locking device which prevents a thief from rotating the nut and removing the spare tire while permitting the owner of the vehicle to quickly and easily access the spare tire.

A still further object of this invention is to provide, for use in conjunction with a vehicle having a spare tire mounting bracket secured to a supporting bolt by a nut, a locking device which substantially encloses and shields the mounting nut, padlock and the elongated threaded bolt to aid in preventing chemical and physical damage thereto.

Other objects of the invention will become apparent from time to time throughout the specification and claims as hereinafter related.

The above noted objects and other objects of the invention are accomplished by a spare tire bracket lock which is slidably received on one end of the spare tire support bracket and has a pin inserted through aligned holes in the bracket lock side walls which passes through the eye of the flange of the support bracket mounting nut. The shackle of a padlock is received through a hole in the pin within the bracket lock to secure the bracket lock on the support bracket to enclose the mounting nut and padlock and substantially surround the elongated threaded bolt restricting access to the padlock and the threaded bolt. A cap covers the open bottom of the spare tire bracket lock to shield the padlock and threaded bolt from water, mud, and debris to prevent chemical and physical damage thereto. A second tubular member is provided to surround another elongated bolt which hingedly retains the other end of the support bracket.

BRIEF DESCRIPTION OF THE DRAWINGS

FIG. 1 is an elevational view of the rear of a pick-up truck showing a spare tire stored against the undercarriage of the truck.

FIG. 2 is a segmented elevational view of the spare tire mounting components with portions shown in cross section.

FIG. 3 is a longitudinal cross section taken along line 3—3 of FIG. 2 showing a first bolt at the end of the support bracket.

FIG. 4 is a longitudinal cross section taken along line 4—4 of FIG. 2 showing a second bolt at the other end of the support bracket.

DESCRIPTION OF THE PREFERRED EMBODIMENT

Figure 5:
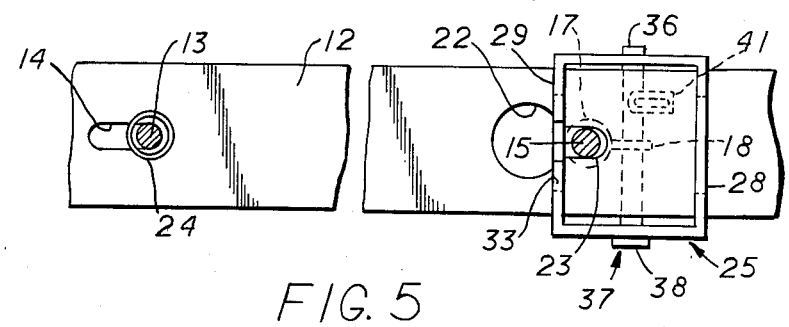
FIG. 5 is a segmented plan view of the spare tire mounting components with portions shown in cross section.
Figure 6:
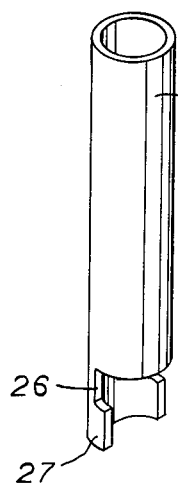
FIG. 6 is an isometric view of the first bolt sleeve member.
Figure 7:
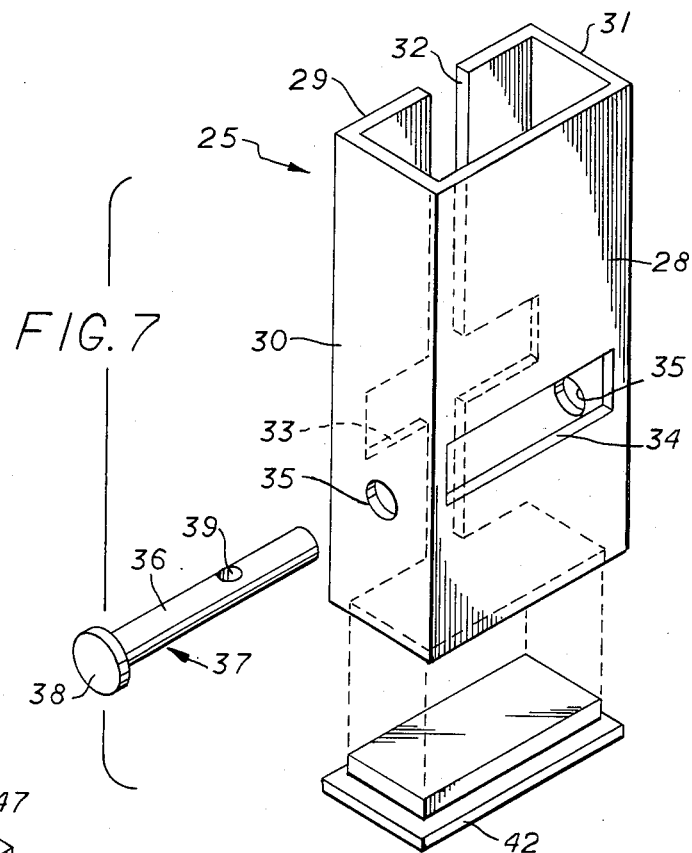
FIG. 7 is an exploded isometric view of one embodiment of the bracket lock in accordance with the present invention.

Referring to the drawings by numerals of reference, there is shown in FIG. 1, the rear portion of a pick-up truck 10 having a spare tire 11 stored against the undercarriage of the truck. Spare tire 11 is supported by an elongated generally flat tire rack or support bracket 12 which is typically contoured to the shape of the spare tire. One end of the support bracket 12 is pivotally attached to the under-carriage of the vehicle, such as by passing a first threaded bolt 13 through a slotted hole 14 in the support bracket 12. The threaded end of bolt 13 is threadedly secured to the vehicle frame and the head of the bolt 13 is larger than the slotted hole 14 for pivotally supporting the first end of support bracket 12. The slotted hole 14 permits the support bracket 12 to be tilted relative to bolt 13 for allowing the opposite end of support bracket 12 to be lowered to the ground when the spare tire must be accessed. The end of the support bracket opposite bolt 13 also includes a hole through which a second bolt 15 is passed for securing the support bracket 12 as is described below.

In FIGS. 2, 3, 4 and 5, the ends of the support bracket 12 which engage the first and second bolts 13 and 15 is illustrated in greater detail. The upper portion of second bolt 15 is pivotally received within a frame member 16. The threaded shaft of bolt 15 extends downwardly from frame member 16 for allowing lateral movement of the lower end of the bolt. An internally threaded nut 17 engages corresponding threads on the lower portion of bolt 15 and includes a flange 18 for rotating nut 17. Flange 18 includes a centrally located eye 19 of sufficient diameter to permit the shackle of a padlock to be passed therethrough in the conventional mounting method. The upper portion of nut 17 may also include a circular shoulder 20 and a circular collar 21, the diameter of collar 21 being slightly larger than the diameter of bolt 15.

As shown best in FIGS. 2, 4 and 5, the portion of support bracket 12 through which the second bolt 15 extends includes a large circular hole 22 and a narrow passage or slot 23 extending therefrom. The width of slot 23 is slightly larger than the diameter of bolt 15 but smaller than the diameter of shoulder 20. When collar 21 is fitted within the slot 23, shoulder 20 engages the underside of spare tire support bracket 12 and urges the bracket 12 upwardly as nut 17 is tightened. Thus, collar 21 of nut 17 extends through the slot 23 within the support bracket 12 and bolt 15 is prevented from sliding toward the hole 22 when nut 17 is tightened. However, if nut 17 is loosened sufficiently, support bracket 12 may be lifted off of shoulder 20 to allow collar 21 to pass beneath support bracket 12. In this instance, bolt 15 can be slid through slot 23 toward hole 22. If flange 18 is then aligned with slot 23, support bracket 12 may then be lowered completely to the ground without requiring complete removal of nut 17 from bolt 15. With one end of support bracket 12 lowered to the ground, the spare tire may be easily accessed. To again store a spare tire beneath pick-up truck 10, the above described procedure is reversed and nut 17 is sufficiently tightened to hold the spare tire firmly in place against the undercarriage of the vehicle.

As mentioned above, spare tires stored in this fashion are often stolen by cutting the supporting bolts or the shackle of the padlock. Accordingly, the present invention provides a first bolt sleeve 24 which surrounds the first bolt 13 and a bracket lock member 25 which substantially surrounds the second bolt 15, the nut 17 and padlock, for preventing access to the bolts, and padlock. As shown in FIGS. 2, 3, 5 and 6, the bolt sleeve 24 comprises an elongate tubular member having a transverse slot 26 in its lower end. The bottom of the sleeve 24 is partially cut away to define a semi-circular bottom flange 27 spaced below the slot 26. The size of bottom flange 27 is smaller in one plane than the width of the slot 14 whereby the bottom flange may be rotated sideways and inserted through the slot and when rotated 90° the flange 27 will be captured beneath the bottom of support bracket 12 due to the arcuate ears being larger in diameter then the width of the slot.

To install the bolt sleeve 24, the first bolt 13 is removed from the frame of the vehicle. The bottom flange 27 is rotated and inserted through the slot 14 and then rotated 90°. The bolt 13 is then inserted upwardly through the sleeve 24 and secured to the frame in the conventional manner. In some applications, the head of the bolt may be tightened with a socket or open end wrench. In this manner, the first bolt 13 is completely surrounded by the sleeve 24.

As shown in FIGS. 2, 4, 5 and 7, the bracket lock 25 comprises an elongate, open ended tubular member having a front wall 28, an opposed back wall 29, and opposed side walls 30 and 31. A longitudinal slot 32 having a width greater than the diameter of nut 17 extends the length of the back wall 29. A transverse slot 33 of a size slightly larger than the height and width of the support bracket 12 is provided in the back wall 29. A second transverse slot 34 of a size slightly larger than the height and width of the support bracket 12 is provided in the front wall 28. Axially aligned holes 35 are provided in the side walls 30 and 31 which slidably receive the shaft 36 of a pin 37. The pin 37 has a head 38 larger than the diameter of the holes 35 and the shaft is slightly smaller in diameter than the eye 19 of the flange 18. A hole 39 is provided through the shaft 36 to receive the shackle of a padlock 41. When the padlock 41 is snapped on, the pin 37 cannot be pulled back through the side walls. An end cap 42 is provided which is secured on the bracket lock to cover the open bottom end of the bracket lock to shield the padlock 41 and threaded bolt 15 from water, mud, and debris and to prevent chemical and physical damage thereto. The end cap may be formed of suitable material such as rubber, plastic or metal.

Figure 8:
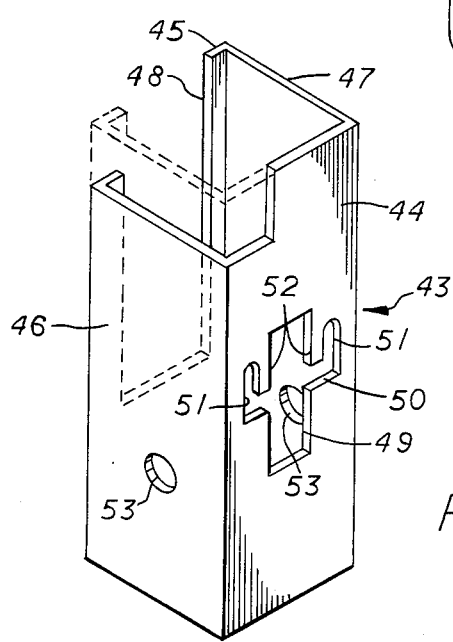
FIG. 8 is an exploded isometric view of a second embodiment of the bracket lock in accordance with the present invention.

FIG. 8 shows another bracket lock of slightly different configuration which will fit support brackets of vehicles where the previously described member will not. The bracket lock illustrated in FIG. 8 may be used on support brackets which have a concave end facing upward. The bracket lock 43 comprises an elongate, open ended tubular member having a front wall 44, an opposed back wall 45, and opposed side walls 46 and 47. A longitudinal slot 48 having a width slightly greater than the width of the support bracket 12 is provided in the back wall 45. The front wall 44 is provided with a longitudinal slot 49 having a width greater than the diameter of nut 17 and a transverse slot 50 of a size slightly larger than the height and width of the concave end of support bracket 12 is provided in the back wall 45. Upwardly extending slots 51 are provided at each end of transverse slot 50 defining depending laterally spaced tabs 52 which fit on the concave surface of support bracket 12. Axially aligned holes 53 are provided in the side walls 46 and 47 which slidably receive the shaft of a pin as previously described. The pin has a head larger than the diameter of the holes and the shaft is slightly smaller in diameter than the eye of the flange 18. A hole is provided through the shaft to receive the shackle of a padlock. When the padlock is snapped on, the pin cannot be pulled back through the side walls. An end cap, previously described and not shown here, is provided which is secured on the bracket lock to cover the open bottom end of the bracket lock to shield the padlock and threaded bolt from water, mud, and debris and to prevent chemical and physical damage thereto.

To install the bracket lock 25 or 43, the support bracket is raised into position and the nut 17 is tightened in the usual manner. The flange 18 of nut 17 should be aligned with the longitudinal axis of the support bracket 12. The bracket lock is placed on the end of the support bracket 12 and is slid toward the spare tire until the holes 35 or 53 are aligned with the eye 19 of the nut flange 18. Pin 37 is inserted through the holes and passing through the eye 19 of the flange 18. The padlock 41 in placed into the bracket lock at the open bottom end and the shackle 40 is inserted into the hole 39 in the pin shaft 36. The padlock is snapped closed and the pin is thus prevented from being removed from the side walls. The end cap 42 is installed to cover the open bottom end of the bracket lock.

When properly installed, the top end of the bracket lock should rest on the undercarriage of the vehicle. It should be understood that the top end of the bracket lock may be cut away or otherwise modified (as shown in dotted line in FIG. 8) as needed to fit the frame or undercarriage of the vehicle.

From the above description of the invention, it should be appreciated that a bracket lock has been provided for preventing unauthorized removal of a spare tire from the undercarriage of a pick-up truck or similar vehicle. The described bracket lock is easily and quickly applied to conventional spare tire mounting hardware and is adapted to be used in conjunction with a standard padlock without requiring chains or other noisy and inconvenient security devices. The described bracket lock is relatively tamper-proof and significantly impedes the application of cutting tools to the threaded rod and shackle of an inserted padlock. The end cap secured on the bracket lock to cover the open bottom end of the bracket lock shields the padlock and threaded bolt from water, mud, and debris and aids in preventing chemical and physical damage thereto.

While this invention has been described fully and completely with special emphasis upon a couple of preferred embodiments, it should be understood that within the scope of the appended claims the invention may be practiced otherwise than as specifically described herein.

I claim:

1. A spare tire bracket lock for installation on the existing spare tire support bracket of a pick-up truck or similar vehicle of the type having an elongated spare tire support bracket for supporting the spare tire in the stored position against the undercarriage of the vehicle and an elongated threaded bolt extending vertically through an aperture at one end of the tire support bracket engaged by a flanged nut having an eye therein, said spare tire bracket lock comprising;

a quadrilateral tubular member having open top and bottom ends slidably received on one end of the existing spare tire support bracket, said tubular member having slotted side walls for receiving the said one end of the existing tire support bracket and the threaded bolt and nut therethrough as said tubular member is slid on the one end of the support bracket, said tubular member surrounding the surface of the spare tire support bracket and extending therebelow and thereabove to substantially surround both the existing nut and elongated threaded bolt extending through same said one end to prevent application of cutting tools to said nut and bolt.

2. A spare tire bracket lock according to claim 1 including
a closure member removably received on the bottom end of said tubular member to enclose said bottom end to shield said existing nut and threaded bolt from water, mud debris and the like to aid in preventing chemical and physical damage thereto.

3. A spare tire bracket lock according to claim 1 in which
said tubular member having holes through opposing side walls in axial alignment with the eye of said nut when said nut is threaded on said bolt within said tubular member, and
a pin received through said holes and passing through the eye of said nut to prevent rotation of said nut.

4. A spare tire bracket lock according to claim 3 in which
said pin is provided with a transverse hole for receiving the shackle of a padlock therethrough within said tubular member to prevent the unauthorized removal of said pin from said tubular member, and
said tubular member substantially surrounding the existing nut and threaded bolt, and the padlock to prevent application of cutting tools to said nut, bolt and padlock.

5. A spare tire bracket lock according to claim 4 including
a closure member removably received on the bottom end of said tubular member to enclose said bottom end to shield said existing nut and threaded bolt and said padlock from water, mud, debris and the like to aid in preventing chemical and physical damage thereto.

6. A spare tire bracket lock according to claim 1 wherein
the existing spare tire support bracket includes a second elongated bolt extending through a second aperture at the other end of the support bracket for hingedly supporting said other end thereon, and said spare tire bracket lock further comprising;
a cylindrical member having a side wall and open top and bottom ends slidably received through the aperture on said other end of said spare tire support bracket,
said cylindrical member having a transverse slot through its side wall near the bottom end and a portion of the side wall below the slot cut away to define an arcuate flange of size and shape to pass through the second aperture when rotated about its longitudinal axis in one direction and when rotated in another direction to become captured beneath the existing spare tire support bracket,
said arcuate flange extending below the remaining portion of said cylindrical member extending thereabove, and
said second elongated bolt removably received and substantially enclosed within said cylindrical member.

7. A spare tire bracket lock according to claim 1 in which
said quadrilateral tubular member is formed of a length of square tubing.

8. A spare tire bracket lock according to claim 1 in which
said quadrilateral tubular member is formed of a length of rectangular tubing.

* * * * *